US011014821B2

(12) United States Patent
Lang

(10) Patent No.: US 11,014,821 B2
(45) Date of Patent: May 25, 2021

(54) METHODS FOR PREPARATION OF CHA ZEOLITE AT AMBIENT PRESSURE

(71) Applicant: Zeolyfe, LLC, Longwood, FL (US)

(72) Inventor: David Ari Lang, Longwood, FL (US)

(73) Assignee: Zeolyfe, LLC, Longwood, FL (US)

( * ) Notice: Subject to any disclaimer, the term of this patent is extended or adjusted under 35 U.S.C. 154(b) by 11 days.

(21) Appl. No.: 16/506,253

(22) Filed: Jul. 9, 2019

(65) Prior Publication Data

US 2020/0010332 A1 Jan. 9, 2020

Related U.S. Application Data

(60) Provisional application No. 62/695,269, filed on Jul. 9, 2018.

(51) Int. Cl.
*C01B 39/48* (2006.01)
*B01J 29/70* (2006.01)
*B01J 19/18* (2006.01)

(52) U.S. Cl.
CPC ........... *C01B 39/48* (2013.01); *B01J 29/7015* (2013.01); *B01J 19/18* (2013.01); *B01J 2219/0013* (2013.01); *B01J 2219/00101* (2013.01)

(58) Field of Classification Search
CPC ........ C01B 39/48; B01J 29/7015; B01J 37/10
See application file for complete search history.

(56) References Cited

U.S. PATENT DOCUMENTS

| 3,516,786 | A | * | 6/1970 | Maher ................. C01B 33/2838 423/710 |
| 3,962,132 | A | * | 6/1976 | Haschke ............... C01B 39/026 252/179 |
| 4,309,313 | A | | 1/1982 | Barrett et al. |
| 4,340,573 | A | * | 7/1982 | Vaughan .............. C01B 33/2823 423/709 |
| 4,503,024 | A | | 3/1985 | Bourgogne et al. |
| 4,544,538 | A | | 10/1985 | Zones |
| 4,576,807 | A | | 3/1986 | Loechelt, II |
| 5,308,808 | A | * | 5/1994 | Gregar ..................... C04B 33/04 106/486 |
| 5,637,287 | A | | 6/1997 | Vaughan et al. |
| 6,258,991 | B1 | * | 7/2001 | Verduijn .................. B01J 29/60 585/407 |
| 9,561,477 | B2 | * | 2/2017 | Dutta ..................... B01J 29/082 |

(Continued)

FOREIGN PATENT DOCUMENTS

| GB | 1342977 A | * | 1/1974 | ......... C01B 33/2815 |
| WO | 0170629 A2 | | 9/2001 | |

OTHER PUBLICATIONS

Li, Investigation of Rapid Synthesis Zeolite, Thesis Ohio States University, Dec. 2014, p. 7, First Paragraph and Figure 3.

(Continued)

*Primary Examiner* — David M Brunsman
(74) *Attorney, Agent, or Firm* — Bekiares Eliezer LLP

(57) ABSTRACT

The disclosure, in one aspect, relates to methods of preparing a CHA zeolite under ambient pressure conditions. In further aspects, the disclosure relates to methods such that a mother liquor can be isolated from a disclosed method, and recycled for use in a disclosed method for further preparation of a CHA zeolite. This abstract is intended as a scanning tool for purposes of searching in the particular art and is not intended to be limiting of the present disclosure.

20 Claims, 2 Drawing Sheets

(56) References Cited

U.S. PATENT DOCUMENTS

| | | | |
|---|---|---|---|
| 10,589,216 B2* | 3/2020 | Dutta | ................... B01D 71/028 |
| 2009/0285737 A1 | 11/2009 | Bull et al. | |
| 2010/0233364 A1 | 9/2010 | Mizuno et al. | |
| 2016/0115039 A1 | 4/2016 | Okubo et al. | |

OTHER PUBLICATIONS

International Search Report issued for application PCT/US2019/041012, dated Sep. 30, 2019.
International Preliminary Report on Patentability dated Jan. 21, 2021 cited in Application No. PCT/US19/41012, 11 pgs.

* cited by examiner

METHODS FOR PREPARATION OF CHA ZEOLITE AT AMBIENT PRESSURE

CROSS-REFERENCE TO RELATED APPLICATIONS

This application claims the benefit of U.S. Provisional Application No. 62/695,269, filed on Jul. 9, 2018, which is incorporated herein by reference in its entirety.

BACKGROUND

Zeolites are crystalline or quasi-crystalline aluminosilicates constructed of repeating $SiO_4$ and $AlO_4$ tetrahedral units. These units are linked together to form frameworks having regular intra-crystalline cavities and channels of molecular dimensions. Numerous types of synthetic Zeolites have been synthesized and each has a unique framework based on the specific arrangement its tetrahedral units. By convention, each framework type is assigned a unique three letter code (e.g., "CHA") by the International Zeolite Association (IZA). Chabazite (CHA) is a molecular sieve framework that is highlighted for the eight-membered ring (8-MR) structural feature.

The industrial importance of CHA has been well described by Bull, et al. in US Patent Appl. No. 2009/0285737 described using the SSZ-13 CHA (Zones synthesis) in as a selective catalytic reduction (SCR) catalyst. SCR technology is widely used in the emission control industry to reduce NOx emissions. Ji described a process to perform post synthesis steaming of aluminum silicate CHA to achieve a methanol to olefins (MTO) catalysts. MTO can potentially be an important process for the overall refinement of natural gas (methane converts to methanol).

The synthesis of the aluminum silicate version of CHA with only sodium as an alkali in the reactive medium and the use of a structure directing agent (SDA) have been extensively studied. This process was originally described by Zones, et al. in U.S. Pat. No. 4,544,538. Faujasite (FAU) conversion has been a well-established technique for synthesizing smaller pore zeolites such as an 8-MR CHA. The original example of a FAU conversion to obtain CHA was described in U.S. Pat. No. 4,503,024. This FAU conversion technique was able to push the activation energy for CHA synthesis down far enough to possibly have an ambient pressure. The synthesis described by Bourgogne describes a process that involved a potassium containing synthesis media without the use of an SDA. The CHA produced under potassium containing conditions will have potassium ions in the product. This product causes an issue with removing the large potassium ions from the structure in post synthesis procedures. The use of a potassium containing CHA in a catalytic system as compared to a sodium containing CHA will produced a diminished catalytic performance because of the large ion removal affect. With the Bourgogne synthesis, the large potassium can be thought of as an SDA. Use of an SDA is also a variable that drives down the activation energy in the synthesis. Other methods to drive down the activation energy of zeolite synthesis has been described Cecil, et al. in U.S. Pat. No. 4,576,807. The FAU synthesis described by Cecil was accelerated by having a low water proportion of the synthesis media and using seeds.

For purposes of driving down the activation energy and having a sodium reaction media (avoiding potassium) in an ambient pressure reactor, a carefully thought out procedure involving parts of the previously described techniques can achieve this goal. A sealed reflux reactor system is still required for this invention to maintain water balance. An ambient pressure reactor compared to a high-pressure reactor is a much more efficient vessel for synthesis. Eliminating the need to pressurize the synthesis vessel greatly reduces the process requirements to perform synthesis. Additionally, the capital expenditure related to an ambient pressure process is far less than a high-pressure process. The requirement of heavy duty parts and added safety devices are a considerable expense for pressure reactors. For added benefit of reducing overall input and effluent of the process, mother liquor (ML) recycle is an important step. Solid product is removed and the mother liquor is reused as a reagent in a subsequent batch. Vaughan used ML recycle for a FAU zeolite synthesis described by Vaughan, et al. in U.S. Pat. No. 5,637,287.

Despite advances in research directed to preparation of zeolite materials, there is still a scarcity of methods that permit preparation of CHA zeolite under conditions of ambient pressure. These needs and other needs are satisfied by the present disclosure.

SUMMARY

In accordance with the purpose(s) of the present disclosure, as embodied and broadly described herein, the disclosure, in one aspect, relates to methods of preparing a CHA zeolite under ambient pressure conditions.

In various aspects, the present disclosure relates to methods for preparing a CHA zeolite, the method comprising: heating a zeolite precursor mixture at ambient pressure in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 80° C. to about 120° C.; thereby forming a CHA zeolite and a mother liquor solution.

In a further aspect, the present disclosure relates to methods for preparing a CHA zeolite, the method comprising: providing an zeolite precursor mixture comprising water, a silicate solution, a zeolite, and a hydroxide compound; heating the zeolite precursor mixture at about 700 torr to about 800 torr in a reflux reactor system comprising a reaction vessel and a condenser; wherein the condenser comprising an end operably connected to the reaction vessel and a condenser top end located opposite and distal to the end operably connected to the reaction vessel; wherein heating comprises heating the reaction vessel such the zeolite precursor mixture is at a temperature of about 80° C. to about 120° C. and heating the condenser such that an internal portion proximal to the condenser top end has a temperature of about 30° C. to about 70° C.; and wherein heating is carried out for a time of about 12 hours to about 96 hours; thereby forming a CHA zeolite.

In a further aspect, the present disclosure relates to methods for preparing a CHA zeolite, the method comprising: mixing a mother liquor solution, isolated from a reaction carried out according to a disclosed method, with a zeolite precursor mixture comprising a silicate solution, a zeolite, and a CHA templating agent; heating the mother liquor solution and the zeolite precursor mixture at ambient pressure in a reflux reactor system comprising a reflux reaction vessel and a reflux condenser; wherein the mother liquor solution comprises $SiO_2$, $Na_2O$, and water; wherein the condenser comprising an end operably connected to the reaction vessel and a condenser top end located opposite and distal to the end operably connected to the reaction vessel; wherein heating comprises heating the reaction vessel such the zeolite precursor mixture and the mother liquor solution in the reflux reaction vessel has a reaction temperature of from about 80° C. to about 120° C.; and thereby forming a CHA zeolite and a secondary mother liquor solution.

In a further aspect, the present disclosure relates to methods for preparing a CHA zeolite, the method comprising: providing a mother liquor solution isolated from a reaction carried out according to a disclosed method; wherein the mother liquor solution comprises $SiO_2$, $Na_2O$, and water; mixing the mother liquor solution with a zeolite precursor mixture comprising a silicate solution, a zeolite, and a hydroxide compound; heating the mother liquor solution and the zeolite precursor mixture at about 700 torr to about 800 torr in a reflux reactor system comprising a reaction vessel and a condenser; wherein the condenser comprising an end operably connected to the reaction vessel and a condenser top end located opposite and distal to the end operably connected to the reaction vessel; wherein heating comprises heating the reaction vessel such the zeolite precursor mixture is at a temperature of about 80° C. to about 120° C. and heating the condenser such that an internal portion proximal to the condenser top end has a temperature of about 30° C. to about 70° C.; and wherein heating is carried out for a time of about 12 hours to about 96 hours; thereby forming a CHA zeolite.

In a further aspect, the present disclosure relates to a zeolite prepared by a disclosed method.

In a further aspect, the present disclosure relates to an article comprising a zeolite prepared by a disclosed method.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
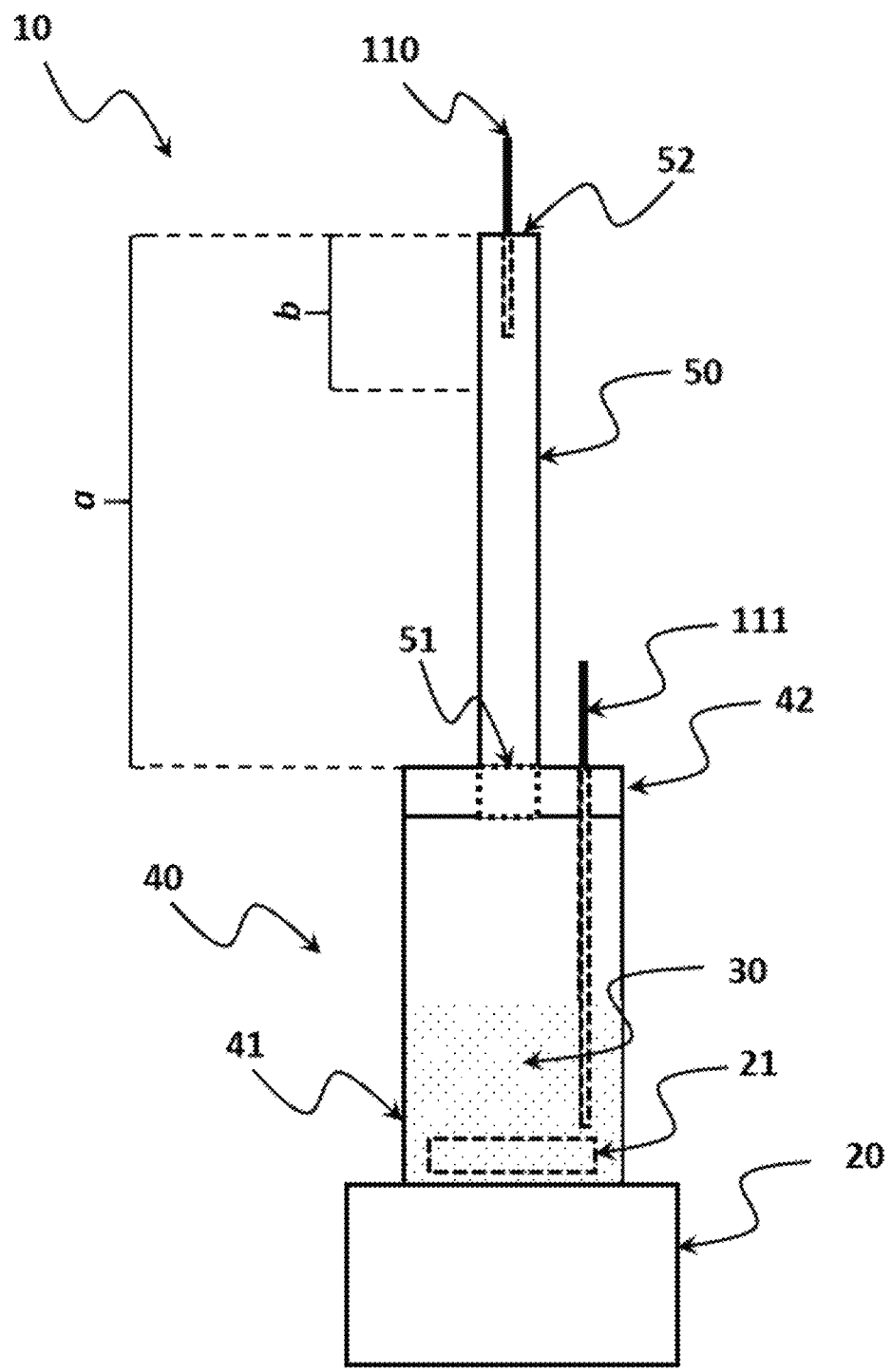
FIG. 1 is a representative schematic side-view cross-sectional illustration of a disclosed reflux reactor system useful in carrying out the disclosed methods.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a zeolite," "a silicate solution," or "a hydroxide," including, but not limited to, two or more such zeolites, silicate solutions, or hydroxides, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a silicate solution refers to an amount that is sufficient to achieve the desired improvement in the property modulated by the formulation component, e.g. achieving the desired level of reaction to form a CHA zeolite. The specific level in terms of wt % in a composition required as an effective amount will depend upon a variety of factors including the amount and type of sodium silicate solution, amount and type of zeolite used in the reaction to form the CHA zeolite, amount and type of other reaction components, and the desired properties of the CHA zeolite.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Disclosed Methods of Preparing a CHA Zeolite

In various aspects, disclosed herein are methods for preparing a CHA zeolite utilizing low temperature, e.g., from about 60° C. to about 120° C., and low pressure, e.g., ambient pressure or from about 600 torr to about 900 torr, in a reflux reactor system comprising a reflux reaction vessel and a reflux condenser. In a further aspect, the disclosed methods for preparing a CHA zeolite utilize low temperature, e.g., from about 80° C. to about 120° C., and low pressure, e.g., ambient pressure or from about 700 torr to about 800 torr, in a reflux reactor system comprising a reflux reaction vessel and a reflux condenser. In some instances, the disclosed method is carried out at ambient pressure. The mixture in the reaction vessel can by agitated during the method by using agitation methods typical in the art, e.g., the agitation method can be static or stirred. Suitable stirring methods include magnetic stir bar, stirred by propeller/impeller, and paddle stirring. In some instances, stirring of the mixture in the reaction vessel is carried out using a magnetic stir bar or propeller/impeller. Reaction temperature can be monitored by internal reactor probe within the reflux reaction vessel, a temperature probe within the top region of the reflux condenser, or both. In some aspects, temperature can be monitored using both an internal reactor probe within the reflux reaction vessel and a temperature probe within the top region of the reflux condenser. In various aspects, heating of the reflux reactor system can be via a heating source such as an external heating element, an internal heating element, or an externally gas fired heat source. In a further aspect, the reflux reactor system can be heated using an external heating element. Various configurations of the reflux reactor system are possible. In some aspects, the reflux reactor system is pressure sealed, but allowing the top of the condenser to be open to ambient conditions.

Referring now to FIG. 1, which shows a representative schematic side-view cross-sectional illustration of a disclosed reflux reactor system 10 useful in carrying out the disclosed methods. The reflux reactor system 10 comprises a magnetic stirring and heating apparatus that provides a source of heat to the reflux reaction vessel 40, comprising a reflux reaction vessel 41 and reflux reaction vessel cap 42, and a means to rotate the magnetic stirring component 21. In alternative aspects, an immersion heater can be placed within the reflux reaction vessel 41. The magnetic stirring component can be a bar, paddle, or other suitable shape that is turned by a magnetic stirring apparatus. In alternative aspects, a stirring component can be turned via operable connection to a rod that is operably connected to a rotatable component. The zeolite precursor mixture 30 is placed within an internal cavity of the reflux reaction vessel 40. The reflux reaction vessel 41 is operably engaged with the reflux reaction vessel cap 42, thereby sealing the reflux reaction vessel 41 except for the opening to the reflux condenser 50. The reflux reaction vessel cap 42 also comprises an opening with an airtight seal through which a reflux reaction vessel temperature probe 111 can be inserted. The reflux condenser 50 comprises a condenser bottom end 51 and a condenser top end 52. The condenser top end 52 is not sealed and is open to the surround ambient air, including air pressure. A condenser temperature probe 110 can be inserted through the condenser top end 52 and extend within a top portion of the reflux condenser 50 within the region associated with a reflux upper portion distance b. The condenser temperature probe 110 can be used to measure the vapor temperature of the components from the zeolite precursor mixture 30, which upon heating, form, in part, a vapor mixture within the reflux condenser 50. The length of the reflux condenser 50 is associated with a total reflux condenser length a.

In various aspects, the present disclosure relates to methods for preparing a CHA zeolite, the method comprising: heating a zeolite precursor mixture at ambient pressure in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 60° C. to about 120° C.; thereby forming a CHA zeolite and a mother liquor solution.

In various aspects, the present disclosure relates to methods for preparing a CHA zeolite, the method comprising: heating a zeolite precursor mixture at ambient pressure in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 80° C. to about 120° C.; thereby forming a CHA zeolite and a mother liquor solution.

In various aspects, the present disclosure relates to methods for preparing a CHA zeolite, the method comprising: heating a zeolite precursor mixture in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 60° C. to about 120° C.; and wherein heating comprises heating a reaction pressure of about 600 torr to about 900 torr; thereby forming a CHA zeolite and a mother liquor solution.

In various aspects, the present disclosure relates to methods for preparing a CHA zeolite, the method comprising: heating a zeolite precursor mixture in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 80° C. to about 120° C.; and wherein heating comprises heating a reaction pressure of about 700 torr to about 800 torr; thereby forming a CHA zeolite and a mother liquor solution.

In various aspects, the present disclosure relates to methods for preparing a CHA zeolite, the method comprising: heating a zeolite precursor mixture in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 60° C. to about 120° C.; and wherein heating comprises heating a reaction pressure of about 700 torr to about 800 torr; thereby forming a CHA zeolite and a mother liquor solution.

In various aspects, the present disclosure relates to methods for preparing a CHA zeolite, the method comprising: heating a zeolite precursor mixture in a reflux reaction vessel of a reflux reactor system comprising the reflux reaction vessel and a reflux condenser; wherein the zeolite precursor mixture comprises water, a silicate solution, a zeolite, and a CHA templating agent; wherein heating comprises heating the reaction vessel such the zeolite precursor mixture in the reflux reaction vessel has a reaction temperature of from about 80° C. to about 120° C.; and wherein heating comprises heating a reaction pressure of In a further aspect, the present disclosure relates to methods for preparing a CHA zeolite, the method comprising: providing an zeolite precursor mixture comprising water, a silicate solution, a zeolite, and a hydroxide compound; heating the zeolite precursor mixture at about 700 torr to about 800 torr in a reflux reactor system comprising a reaction vessel and a condenser; wherein the condenser comprising an end operably connected to the reaction vessel and a condenser top end located opposite and distal to the end operably connected to the reaction vessel; wherein heating comprises heating the reaction vessel such the zeolite precursor mixture is at a temperature of about 80° C. to about 120° C. and heating the condenser such that an internal portion proximal to the condenser top end has a temperature of about 30° C. to about 70° C.; and wherein heating is carried out for a time of about 12 hours to about 96 hours; thereby forming a CHA zeolite.

In a further aspect, the present disclosure relates to methods for preparing a CHA zeolite, the method comprising: providing an zeolite precursor mixture comprising water, a silicate solution, a zeolite, and a hydroxide compound; heating the zeolite precursor mixture at about 700 torr to about 800 torr in a reflux reactor system comprising a reaction vessel and a condenser; wherein the condenser comprising an end operably connected to the reaction vessel and a condenser top end located opposite and distal to the end operably connected to the reaction vessel; wherein heating comprises heating the reaction vessel such the zeolite precursor mixture is at a temperature of about 60° C. to about 120° C. and heating the condenser such that an internal portion proximal to the condenser top end has a temperature of about 30° C. to about 70° C.; and wherein heating is carried out for a time of about 12 hours to about 96 hours; thereby forming a CHA zeolite.

In a further aspect, the present disclosure relates to methods for preparing a CHA zeolite, the method comprising: mixing a mother liquor solution, isolated from a reaction carried out according to a disclosed method, with a zeolite precursor mixture comprising a silicate solution, a zeolite, and a CHA templating agent; heating the mother liquor solution and the zeolite precursor mixture at ambient pressure in a reflux reactor system comprising a reflux reaction vessel and a reflux condenser; wherein the mother liquor solution comprises $SiO_2$, $Na_2O$, and water; wherein the condenser comprising an end operably connected to the reaction vessel and a condenser top end located opposite and distal to the end operably connected to the reaction vessel; wherein heating comprises heating the reaction vessel such the zeolite precursor mixture and the mother liquor solution in the reflux reaction vessel has a reaction temperature of from about 80° C. to about 120° C.; and thereby forming a CHA zeolite and a secondary mother liquor solution.

In a further aspect, the present disclosure relates to methods for preparing a CHA zeolite, the method comprising: providing a mother liquor solution isolated from a reaction carried out according to a disclosed method; wherein the mother liquor solution comprises SiO2, Na2O, and water; mixing the mother liquor solution with a zeolite precursor mixture comprising a silicate solution, a zeolite, and a hydroxide compound; heating the mother liquor solution and the zeolite precursor mixture at about 700 torr to about 800 torr in a reflux reactor system comprising a reaction vessel and a condenser; wherein the condenser comprising an end operably connected to the reaction vessel and a condenser top end located opposite and distal to the end operably connected to the reaction vessel; wherein heating comprises heating the reaction vessel such the zeolite precursor mixture is at a temperature of about 80° C. to about 120° C. and heating the condenser such that an internal portion proximal to the condenser top end has a temperature of about 30° C. to about 70° C.; and wherein heating is carried out for a time of about 12 hours to about 96 hours; thereby forming a CHA zeolite.

In various aspects, the reaction temperature in the reactor vessel is from about 60° C. to about 120° C. In a further aspect, the reaction temperature is from about 90° C. to about 110 degrees Celsius. In still further aspects, the reaction temperature is about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 120° C.; or a range of temperatures encompassed by an two of the foregoing values; or any combination of ratios from the foregoing values; or any combination of temperatures from the foregoing values.

In various aspects, the heating comprises heating such that an internal portion proximal to a reflux condenser top end has a temperature of about 30° C. to about 70° C. That is, the reflux condenser comprises an end operably connected to the reflux reaction vessel, i.e., a reflux condenser bottom end, and a reflux condenser top end located opposite and distal to the end operably connected to the reflux reaction vessel, i.e., the reflux condenser bottom end. In a further aspect, the air temperature within the condenser in a region near or proximal to the top end (e.g., see the region within the distance b in FIG. 1) of the reflux condenser top end has a temperature of about 30° C. to about 70° C. The air temperature in the region near or proximal to the top end of the condenser top end can be determined using a standard temperature probe inserted within the internal portion of the air space in the indicated portion of the reflux condenser top end. In some instances, the internal portion proximal to a reflux condenser top end comprises about 5% of a total length of the condenser located from the reflux condenser top end, where the total length of the condenser (e.g., see the distance a in FIG. 1) is a linear distance measured from the reflux condenser bottom end to the reflux condenser top end. It is understood that "about 5% of a total length of the condenser located from the reflux condenser top end" represents a linear distance that is 5% of the total length of the reflux condenser that is measured from the reflux condenser top end extending downward towards the reflux condenser bottom end.

In a further aspect, the heating comprises heating such that an internal portion proximal to a reflux condenser top end has a temperature of about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., about 70° C.; or a range of temperatures encompassed by an two of the foregoing values; or any combination of ratios from the foregoing values; or any combination of temperatures from the foregoing values.

In a further aspect, the disclosed method can be carried out at a low pressure in the reflux reaction vessel and reflux condenser, such that the pressure is from about 600 torr to about 900 torr. In a still further aspect, the disclosed method can be carried out at a pressure in the reflux reaction vessel and reflux condenser of from about 700 torr to about 800 torr. In yet further aspects, the disclosed method can be carried out at a pressure in the reflux reaction vessel and reflux condenser of about 600 torr, about 605 torr, about 610 torr, about 615 torr, about 620 torr, about 625 torr, about 630 torr, about 635 torr, about 640 torr, about 645 torr, about 650 torr, about 655 torr, about 660 torr, about 665 torr, about 670 torr, about 675 torr, about 680 torr, about 685 torr, about 690 torr, about 695 torr, about 700 torr, about 705 torr, about 710 torr, about 715 torr, about 720 torr, about 725 torr, about 730 torr, about 735 torr, about 740 torr, about 745 torr, about 750 torr, about 755 torr, about 760 torr, about 765 torr, about 770 torr, about 775 torr, about 780 torr, about 785 torr, about 790 torr, about 795 torr, about 800 torr, about 805 torr, about 810 torr, about 815 torr, about 820 torr, about 825 torr, about 830 torr, about 835 torr, about 840 torr, about 845 torr, about 850 torr, about 855 torr, about 860 torr, about 865 torr, about 870 torr, about 875 torr, about 880 torr, about 885 torr, about 890 torr, about 895 torr, about 900 torr; or a range of pressures encompassed by an two of the foregoing values; or any combination of ratios from the foregoing values; or any combination of pressures from the foregoing values.

In various aspects, the mole ratio of $SiO_2$ to $Al_2O_3$ (also referred to herein as the SAR) in the reaction mixture is about 10 to about 150. In a further aspect, the mole ratio of $SiO_2$ to $Al_2O_3$ in the reaction mixture is about 30 to about 80. In various further aspects, the mole ratio of $SiO_2$ to $Al_2O_3$ in the reaction mixture is about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, about 80, about 81, about 82, about 83, about 84, about 85, about 86, about 87, about 88, about 89, about 90, about 91, about 92, about 93, about 94, about 95, about 96, about 97, about 98, about 99, about 100, about 101, about 102, about 103, about 104, about 105, about 106, about 107, about 108, about 109, about 110, about 111, about 112, about 113, about 114, about 115, about 116, about 117, about 118, about 119, about 120, about 121, about 122, about 123, about 124, about 125, about 126, about 127, about 128, about 129, about 130, about 131, about 132, about 133, about 134, about 135, about 136, about 137, about 138, about 139, about 140, about 141, about 142, about 143, about 144, about 145, about 146, about 147, about 148, about 149, about 150; or a range of ratios encompassed by an two of the foregoing values; or any combination of ratios from the foregoing values.

In various aspects, the mole ratio of $Na_2O$ to $Al_2O_3$ is about 5 to about 40. In a further aspect, the mole ratio of $Na_2O$ to $Al_2O_3$ is about 12 to about 36. In a still further aspect, the mole ratio of $Na_2O$ to $Al_2O_3$ is about 14 to about 34. In various further aspects, the mole ratio of $Na_2O$ to $Al_2O_3$ is about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40; or a range of ratios encompassed by an two of the foregoing values; or any combination of ratios from the foregoing values.

In various aspects, the mole ratio of $H_2O$ to $Al_2O_3$ (also referred to herein as the solids content) is about 100 to about 5000. In a further aspect, the mole ratio of $H_2O$ to $Al_2O_3$ is about 300 to about 1000. In a still further aspect, the mole ratio of $H_2O$ to $Al_2O_3$ is about 400 to about 1000. In various further aspects, the mole ratio of $SiO_2$ to $Al_2O_3$ is about 100, about 105, about 110, about 115, about 120, about 125, about 130, about 135, about 140, about 145, about 150, about 155, about 160, about 165, about 170, about 175, about 180, about 185, about 190, about 195, about 200, about 205, about 210, about 215, about 220, about 225, about 230, about 235, about 240, about 245, about 250, about 255, about 260, about 265, about 270, about 275, about 280, about 285, about 290, about 295, about 300, about 305, about 310, about 315, about 320, about 325, about 330, about 335, about 340, about 345, about 350, about 355, about 360, about 365, about 370, about 375, about 380, about 385, about 390, about 395, about 400, about 405, about 410, about 415, about 420, about 425, about 430, about 435, about 440, about 445, about 450, about 455, about 460, about 465, about 470, about 475, about 480, about 485, about 490, about 495, about 500, about 505, about 510, about 515, about 520, about 525, about 530, about 535, about 540, about 545, about 550, about 555, about 560, about 565, about 570, about 575, about 580, about 585, about 590, about 595, about 600, about 605, about 610, about 615, about 620, about 625, about 630, about 635, about 640, about 645, about 650, about 655, about 660, about 665, about 670, about 675, about 680, about 685, about 690, about 695, about 700, about 705, about 710, about 715, about 720, about 725, about 730, about 735, about 740, about 745, about 750, about 755, about 760, about 765, about 770, about 775, about 780, about 785, about 790, about 795, about 800, about 805, about 810, about 815, about 820, about 825, about 830, about 835, about 840, about 845, about 850, about 855, about 860, about 865, about 870, about 875, about 880, about 885, about 890, about 895, about 900, about 905, about 910, about 915, about 920, about 925, about 930, about 935, about 940, about 945, about 950, about 955, about 960, about 965, about 970, about 975, about 980, about 985, about 990, about 995, about 1000, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, about 3400, about 3500, about 3600, about 3700, about 3800, about 3900, about 4000, about 4100, about 4200, about 4300, about 4400, about 4500, about 4600, about 4700, about 4800, about 4900, about 5000; or a range of ratios encompassed by an two of the foregoing values; or any combination of ratios from the foregoing values.

In various aspects, the mole ratio of structure directing agents (SDA) to $Al_2O_3$ is about 0.2 to about 20. In a further aspect, the mole ratio of structure directing agents (SDA) to $Al_2O_3$ is about 0.5 to about 5. In a still further aspect, the mole ratio of structure directing agents (SDA) to $Al_2O_3$ is about 0.6 to about 3. In various further aspects, the mole ratio of structure directing agents (SDA) to $Al_2O_3$ is about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, about 0.40, about 0.41, about 0.42, about 0.43, about 0.44, about 0.45, about 0.46, about 0.47, about 0.48, about 0.49, about 0.50, about 0.51, about 0.52, about 0.53, about 0.54, about 0.55, about 0.56, about 0.57, about 0.58, about 0.59, about 0.60, about 0.61, about 0.62, about 0.63, about 0.64, about 0.65, about 0.66, about 0.67, about 0.68, about 0.69, about 0.70, about 0.71, about 0.72, about 0.73, about 0.74, about 0.75, about 0.76, about 0.77, about 0.78, about 0.79, about 0.80, about 0.81, about 0.82, about 0.83, about 0.84, about 0.85, about 0.86, about 0.87, about 0.88, about 0.89, about 0.90, about 0.91, about 0.92, about 0.93, about 0.94, about 0.95, about 0.96, about 0.97, about 0.98, about 0.99, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 6.0, about 7.0, about 8.0, about 9.0, about 10, about 11, about 12, about 13, about 14, about 15, about 16, about 17, about 18, about 19, about 20; or a range of ratios encompassed by an two of the foregoing values; or any combination of ratios from the foregoing values.

In various aspects, alkali cation containing reagents in the disclosed synthesis should be of a sodium variety to avoid trapping larger cations into CHA cages.

In various aspects, the disclosed methods utilizes one or more CHA templating agents (also referred to herein as a CHA structure directing agents (SDA)). Non-limiting examples of suitable CHA templating agents in the disclosed methods are N,N,N-trimethyl-1-adamantam-monium hydroxide, tetraethylenepentamine, or a combination of both. In a further aspect, the templating agents or structure directing agents (SDA) for CHA is N,N,N-trimethyl-1-adamantam-monium.

In various aspects, the disclosed methods utilize an alumina source.

In various aspects, the disclosed methods utilize a zeolite. Non-limiting examples of a suitable zeolite that can be utilized in the disclosed methods are USY, pre-treated Na—Y, Na—Y, Na-X, alumina, sodium aluminate, or combinations thereof. In a further aspect, the disclosed methods utilize USY, pre-treated Na—Y, Na—Y, or combinations thereof. In a still further aspect, the disclosed methods utilize USY. In a yet further aspect, the disclosed methods utilize pre-treated Na—Y, Na—Y, or combinations thereof. In some instances, it may be useful to pre-treat the Na—Y used in the disclosed methods. For example, Na—Y can be by calcination, milling, acid treatment, or steaming, preferably calcination or milling.

In various aspects, the disclosed methods utilize a silica solution, such as, but not limited to, sodium silicate, colloidal silica, or combinations thereof. In some instances, the sodium silicate solution comprises $SiO_2$, $Na_2O$, and water present in the amounts disclosed herein throughout.

In various aspects, crystallization can typically be allowed to nucleate spontaneously or be assisted by seeding. In some instances, crystallization can be allowed to nucleate spontaneously.

In various aspects, the SAR ($SiO_2/Al_2O_3$ ratio) of CHA product is about 5 to about 50. In a further aspect, the SAR ($SiO_2/Al_2O_3$ ratio) of CHA product is about 9 to about 16. In various further aspects, the SAR ($SiO_2/Al_2O_3$ ratio) of CHA product is about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, about 11.0, about 11.1, about 11.2, about 11.3, about 11.4, about 11.5, about 11.6, about 11.7, about 11.8, about 11.9, about 12.0, about 12.1, about 12.2, about 12.3, about 12.4, about 12.5, about 12.6, about 12.7, about 12.8, about 12.9, about 13.0, about 13.1, about 13.2, about 13.3, about 13.4, about 13.5, about 13.6, about 13.7, about 13.8, about 13.9, about 14.0, about 14.1, about 14.2, about 14.3, about 14.4, about 14.5, about 14.6, about 14.7, about 14.8, about 14.9, about 15.0, about 15.1, about 15.2, about 15.3, about 15.4, about 15.5, about 15.6, about 15.7, about 15.8, about 15.9, about 16.0, about 16.1, about 16.2, about 16.3, about 16.4, about 16.5, about 16.6, about 16.7, about 16.8, about 16.9, about 17.0, about 17.1, about 17.2, about 17.3, about 17.4, about 17.5, about 17.6, about 17.7, about 17.8, about 17.9, about 18.0, about 18.1, about 18.2, about 18.3, about 18.4, about 18.5, about 18.6, about 18.7, about 18.8, about 18.9, about 19.0, about 19.1, about 19.2, about 19.3, about 19.4, about 19.5, about 19.6, about 19.7, about 19.8, about 19.9, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50; or a range of ratios encompassed by an two of the foregoing values; or any combination of ratios from the foregoing values.

In various aspects, the disclosed methods can be carried out under conditions in which the reaction mixture is either neat or mother liquor recycle. Batch preparation can be one batch at a time or continuous flow by periodically charging reagents in and discharging products out, preferably one batch at a time.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Materials and General Methods.

All materials for synthesis of CHA crystals described below and used as received. N,N,N-Trimethyl-1-ammonium adamantine (CAS #53075-09-5; 25% solution obtained from Sachem Americas, Austin, Tex.), USY zeolite ($SiO_2/Al_2O_3$ ratio of 5:1 obtained from Zeolyst International, Conshohocken, Pa.), sodium silicate solution (Fisher), and sodium hydroxide pellets (Alfa Aesar).

NaY can be sourced from a number of commercial vendors. NaY is a synthesized raw material and specifications of synthesized NaY are dependent on parameters that are consistent with the description of NaY. A full description of NaY is available within the IZA database. Pretreatment of NaY to facilitate the ambient pressure synthesis of CHA can be done in various ways. This pre-treatment process can consist of milling to smaller particle size, heat treatment, steam treatment, acidic solution treatment, or any combination of the fore mentioned pre-treatment processes.

Reactor system equipped with a reflux condenser to preserve water in the reactive gel during crystallization (FIG. 1). Agitation was provided by magnetic stir bar and reaction temperature was maintained by thermocouple loaded into a thermal well that soaks in the reactive gel.

CHA Phase Confirmation Performed by X-Ray Diffraction (XRD) Analysis.

Calculation of final product SAR is facilitated by measurement of product yield. The product SAR table indicates a trend downwards with subsequent examples. Table one indicates the synthetic parameters that facilitated the downward trend of product SAR. By reducing the proportion of SDA, SAR ranges were extended downwards.

Example 1

Figure 2:
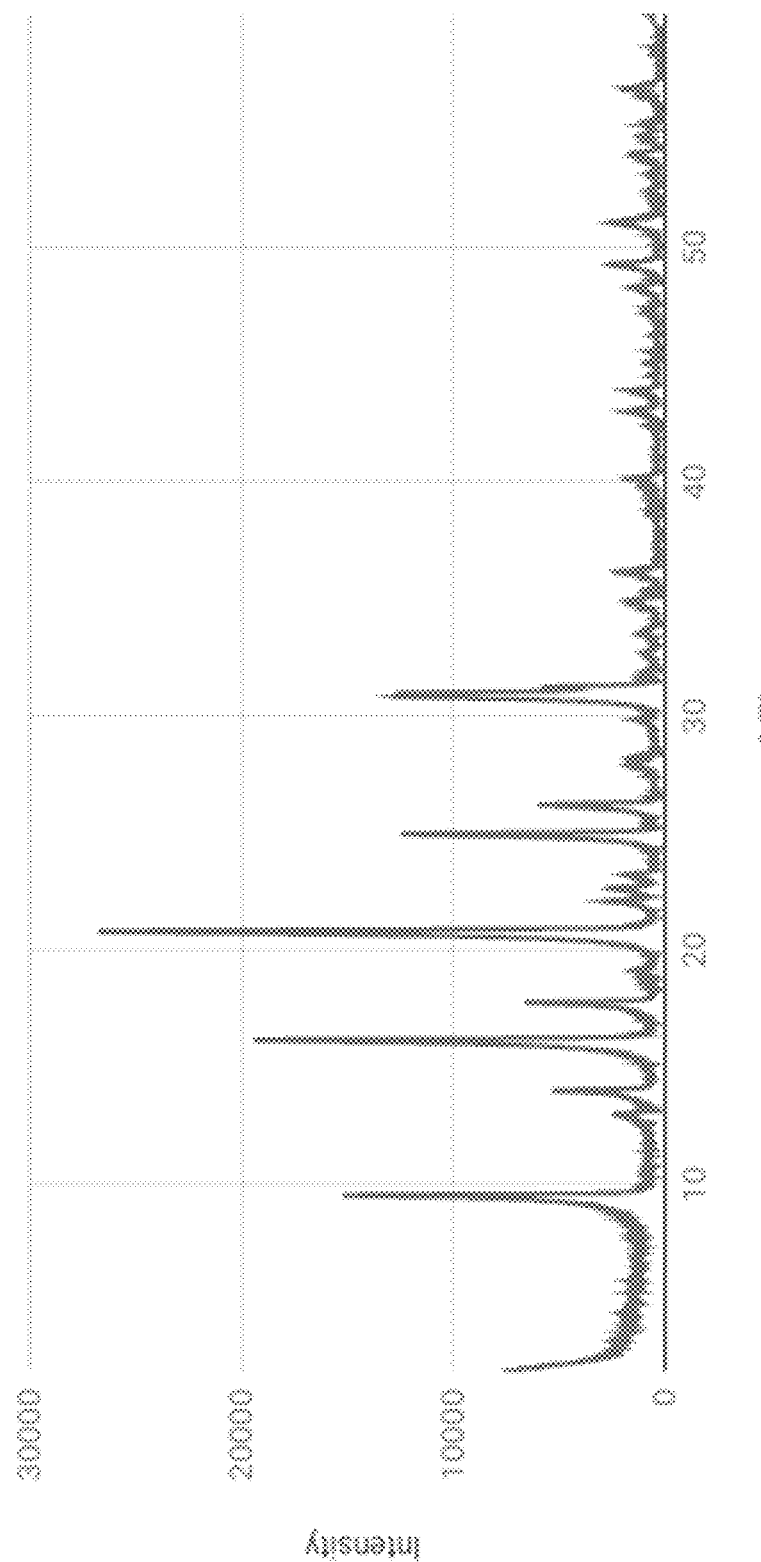
FIG. 2 is representative data obtained by X-ray diffraction ("XRD") of a CHA zeolite prepared by a disclosed method.

The following illustrates the preparation of a CHA zeolite. 160.4 g of sodium silicate solution (46.2 g of $SiO_2$, 14.4 g of $Na_2O$, and 99.8 g of $H_2O$), 7.2 g of USY (4.1 g $SiO_2$ and 1.4 g of $Al_2O_3$), 15.6 g of N,N,N-trimethyl-1-ammonium adamantine solution (25 w/v %), and 15 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. FIG. 2 shows the XRD pattern for this product. Comparison of the FIG. 2 XRD pattern and the IZA database XRD pattern for CHA confirms the formation of CHA zeolite.

Example 2

The following illustrates the preparation of a CHA zeolite. 801.8 g of sodium silicate solution (231.0 g of $SiO_2$, 72.0 g of $Na_2O$, and 499.8 g of $H_2O$), 35.9 g of USY zeolite (20.5 g $SiO_2$ and 7.0 g of $Al_2O_3$), 77.8 g of N,N,N-trimethyl-1-ammonium adamantine solution (25 w/v %), and 75 g of $H_2O$ were added to a reflux reactor system with an internal volume of 3.0 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

Example 3

The following illustrates the preparation of a CHA zeolite. 160.7 g of sodium silicate solution (46.3 g of $SiO_2$, 14.5 g of $Na_2O$, and 100.0 g of $H_2O$), 6.9 g of USY (3.9 g $SiO_2$ and 1.3 g of $Al_2O_3$), 12.5 g of N,N,N-trimethyl-1-ammonium adamantine solution (25 w/v %), and 16.8 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

Example 4

The following illustrates the preparation of a CHA zeolite. 161.3 g of sodium silicate solution (46.5 g of $SiO_2$, 14.5 g of $Na_2O$, and 100.3 g of $H_2O$), 6.9 g of USY (3.9 g $SiO_2$ and 1.3 g of $Al_2O_3$), 9.4 g of N,N,N-trimethyl-1-ammonium adamantine solution (25 w/v %), and 19.3 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

Summarized in Table 1 below are yield and the calculated mole ratio of $SiO_2$ to $Al_2O_3$ (also referred to herein as the SAR) for Examples 1, 3, and 4. The summarized data show a calculated SAR range of about 10-16 based on the calculated values and expected deviation.

TABLE 1

| Example | Yield - CHA Zeolite (grams) | Calculated SAR (from yield)* |
| --- | --- | --- |
| 1 | 17.7 | 14.8 |
| 3 | 14.2 | 12.0 |
| 4 | 12.9 | 11.0 |

*Calculated SAR has a deviation of at least ±1.

Prospective Example 5

The following illustrates the preparation of a CHA zeolite. 801.8 g of sodium silicate solution (231.0 g of $SiO_2$, 72.0 g of $Na_2O$, and 499.8 g of $H_2O$), 35.9 g of NaY zeolite (20.5 g $SiO_2$ and 7.0 g of $Al_2O_3$), 77.8 g of N,N,N-trimethyl-1-ammonium adamantine solution (25 w/v %), and 75 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. Finished product is discharged, filtered by vacuum filtration, and washed with deionized water. Filtered and washed product is then dried in a 120° C. oven for 30 minutes. XRD is used to determine the purity of the CHA product.

Prospective Example 5

The following illustrates the preparation of a CHA zeolite. 801.8 g of sodium silicate solution (231.0 g of $SiO_2$, 72.0 g of $Na_2O$, and 499.8 g of $H_2O$), 35.9 g of NaY zeolite (20.5 g $SiO_2$ and 7.0 g of $Al_2O_3$), 77.8 g of N,N,N-trimethyl-1-ammonium adamantine solution (25 w/v %), and 75 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. Finished product is discharged, filtered by vacuum filtration, and washed with deionized water. Filtered and washed product is then dried in a 120° C. oven for 30 minutes. XRD is used to determine the purity of the CHA product.

Prospective Example 6

The following illustrates the preparation of a CHA zeolite. 801.8 g of sodium silicate solution (231.0 g of $SiO_2$, 72.0 g of $Na_2O$, and 499.8 g of $H_2O$), 35.9 g of pretreated NaY zeolite (20.5 g $SiO_2$ and 7.0 g of $Al_2O_3$), 77.8 g of N,N,N-trimethyl-1-ammonium adamantine solution (25 w/v %), and 75 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. Finished product is discharged, filtered by vacuum filtration, and washed with deionized water. Filtered and washed product is then dried in a 120° C. oven for 30 minutes. XRD is used to determine the purity of the CHA product.

Prospective Example 7

The following illustrates the preparation of a CHA zeolite. 674.0 g of sodium silicate solution (194.2 g of $SiO_2$, 60.5 g of $Na_2O$, and 419.5 g of $H_2O$), 29.0 g of NaY zeolite (20.5 g $SiO_2$ and 7.0 g of $Al_2O_3$), 65.4 g of N,N,N-trimethyl-1-ammonium adamantine solution (25 w/v %), and 218.8 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. Finished product is discharged, filtered by vacuum filtration, and washed with deionized water. Filtered and washed product is then dried in a 120° C. oven for 30 minutes. XRD is used to determine the purity of the CHA product.

Prospective Example 8

The following illustrates the preparation of a CHA zeolite. Mother liquor from example 7 is recycled for use in this current example. 650 g of mother liquor (77.5 g of $SiO_2$, 24.1 g of $Na_2O$, and '67.4 g of $H_2O$), 29.0 g of NaY zeolite (20.5 g $SiO_2$ and 7.0 g of $Al_2O_3$), 40.6 g of N,N,N-trimethyl-1-ammonium adamantine solution (25 w/v %), and 11.0 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. After discharge, mother liquor is decanted and saved from the top of the reacted mixture. Finished product is filtered by vacuum filtration and washed with deionized water. Filtered and washed product is then dried in a 120° C. oven for 30 minutes. XRD is used to determine the purity of the CHA product.

Prospective Example 9

The following illustrates the preparation of a CHA zeolite. 674.0 g of sodium silicate solution (194.2 g of $SiO_2$, 60.5 g of $Na_2O$, and 419.5 g of $H_2O$), 29.0 g of pretreated NaY zeolite (20.5 g $SiO_2$ and 7.0 g of $Al_2O_3$), 65.4 g of N,N,N-trimethyl-1-ammonium adamantine solution (25 w/v %), and 218.8 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. Finished product is discharged, filtered by vacuum filtration, and washed with deionized water. Filtered and washed product is then dried in a 120° C. oven for 30 minutes. XRD is used to determine the purity of the CHA product.

Prospective Example 10

The following illustrates the preparation of a CHA zeolite. Mother liquor from example 9 is recycled for use in this current example. 650 g of mother liquor (77.5 g of $SiO_2$, 24.1 g of $Na_2O$, and '67.4 g of $H_2O$), 29.0 g of pretreated NaY zeolite (20.5 g $SiO_2$ and 7.0 g of $Al_2O_3$), 40.6 g of N,N,N-trimethyl-1-ammonium adamantine solution (25 w/v %), and 11.0 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. After discharge, mother liquor is decanted and saved from the top of the reacted mixture. Finished product is filtered by vacuum filtration and washed with deionized water. Filtered and washed product is then dried in a 120° C. oven for 30 minutes. XRD is used to determine the purity of the CHA product.

It should be emphasized that the above-described embodiments of the present disclosure are merely possible examples of implementations set forth for a clear understanding of the principles of the disclosure.

Prospective Example 11

The following illustrates the preparation of a CHA zeolite. 674.0 g of sodium silicate solution (194.2 g of $SiO_2$, 60.5 g of $Na_2O$, and 419.5 g of $H_2O$), 29.0 g of USY zeolite (20.5 g $SiO_2$ and 7.0 g of $Al_2O_3$), 65.4 g of N,N,N-trimethyl-1-ammonium adamantine solution (25 w/v %), and 218.8 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. Finished product is discharged, filtered by vacuum filtration, and washed with deionized water. Filtered and washed product is then dried in a 120° C. oven for 30 minutes. XRD is used to determine the purity of the CHA product.

Prospective Example 12

The following illustrates the preparation of a CHA zeolite. Mother liquor from example 11 is recycled for use in this current example. 650 g of mother liquor (77.5 g of $SiO_2$, 24.1 g of $Na_2O$, and '67.4 g of $H_2O$), 29.0 g of USY zeolite (20.5 g $SiO_2$ and 7.0 g of $Al_2O_3$), 40.6 g of N,N,N-trimethyl-1-ammonium adamantine solution (25 w/v %), and 11.0 g of $H_2O$ are added to a reflux reactor system with an internal volume of 3.0 liters (schematic representation of reflux reactor system is shown in FIG. 1). 100° C. is maintained within the reactive gel and 50° C. is maintained at the top of the condenser for a period of 2 days. After discharge, mother liquor is decanted and saved from the top of the reacted mixture. Finished product is filtered by vacuum filtration and washed with deionized water. Filtered and washed product is then dried in a 120° C. oven for 30 minutes. XRD is used to determine the purity of the CHA product.

Prospective Example 13

The following illustrates the preparation of a CHA zeolite. 160.7 g of sodium silicate solution (46.3 g of $SiO_2$, 14.5 g of $Na_2O$, and 100.0 g of $H_2O$), 6.9 g of NaY (3.9 g $SiO_2$ and 1.3 g of $Al_2O_3$), 12.5 g of N,N,N-trimethyl-1-ammonium adamantine solution (25 w/v %), and 16.8 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

Prospective Example 14

The following illustrates the preparation of a CHA zeolite. 161.3 g of sodium silicate solution (46.5 g of $SiO_2$, 14.5 g of $Na_2O$, and 100.3 g of $H_2O$), 6.9 g of NaY (3.9 g $SiO_2$ and 1.3 g of $Al_2O_3$), 9.4 g of N,N,N-trimethyl-1-ammonium adamantine solution (25 w/v %), and 19.3 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

Prospective Example 15

The following illustrates the preparation of a CHA zeolite. 160.7 g of sodium silicate solution (46.3 g of $SiO_2$, 14.5 g of $Na_2O$, and 100.0 g of $H_2O$), 6.9 g of pretreated NaY (3.9 g $SiO_2$ and 1.3 g of $Al_2O_3$), 12.5 g of N,N,N-trimethyl-1-ammonium adamantine solution (25 w/v %), and 16.8 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

Prospective Example 16

The following illustrates the preparation of a CHA zeolite. 161.3 g of sodium silicate solution (46.5 g of $SiO_2$, 14.5 g of $Na_2O$, and 100.3 g of $H_2O$), 6.9 g of pretreated NaY (3.9 g $SiO_2$ and 1.3 g of $Al_2O_3$), 9.4 g of N,N,N-trimethyl-1-ammonium adamantine solution (25 w/v %), and 19.3 g of $H_2O$ were added to a reflux reactor system with an internal volume of 0.5 liters (schematic representation of reflux reactor system is shown in FIG. 1). 100° C. was maintained within the reactive gel and 50° C. was maintained at the top of the condenser for a period of 2 days. Finished product was discharged, filtered by vacuum filtration, and washed with DI water. Filtered and washed product was then dried in a 120° C. oven for 30 minutes. XRD indicated pure CHA product was obtained.

In the foregoing examples, the mole ratio of various components in the reaction mixture is summarized in Table 2 below.

TABLE 2

| Mole ratio | $SiO_2/Al_2O_3$ | $Al_2O_3/SiO_2$ | $Na_2O/Al_2O_3$ | $H_2O/Al_2O_3$ | $SDA/Al_2O_3$ |
|---|---|---|---|---|---|
| Examples 1, 2, 5, 6 | 68 | 0.01471 (1/68) | 22 | 580 | 1.5 |
| Example 3, 13, 15 | 68 | 0.01471 (1/68) | 22 | 580 | 1.2 |
| Example 4, 14, 16 | 68 | 0.01471 (1/68) | 22 | 580 | 0.9 |
| Examples 7, 8, 9, 10, 11, 12 | 68 | 0.01471 (1/68) | 22 | 750 | 1.5 |

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for preparing a CHA zeolite, the method comprising:
   heating a zeolite precursor mixture at ambient pressure under reflux conditions;
   wherein the zeolite precursor mixture comprises water, a silicate solution, a zeolite, and a CHA templating agent;
   wherein heating comprises heating such that the zeolite precursor mixture has a reaction temperature of from about 80° C. to about 120° C.;
   thereby forming a CHA zeolite and a mother liquor solution.

2. The method of claim 1, wherein the ambient pressure is about 700 torr to about 800 torr.

3. The method of claim 1, wherein the zeolite in the zeolite precursor mixture is selected from a USY zeolite, heat-treated Na—Y zeolite, a Na—Y zeolite, and combinations thereof.

4. The method of claim 3, wherein the zeolite in the zeolite precursor mixture is selected from a heat-treated Na—Y zeolite, a Na—Y zeolite, and combinations thereof.

5. The method of claim 3, wherein the zeolite in the zeolite precursor mixture is selected from a USY zeolite.

6. The method of claim 1, wherein the silicate solution in the zeolite precursor mixture is a sodium silicate solution comprising $SiO_2$ $Na_2O$, and water.

7. The method of claim 1, wherein the CHA templating agent is selected from N, N, N-trimethyl-1-ammonium adamantine, tetraethylenepentamine, and a combination thereof.

8. The method of claim 1, wherein heating further comprises heating such that an internal portion proximal to a top end of a reflux condenser containing reaction contents has a temperature of about 30° C. to about 70° C.

9. The method of claim 1, wherein the heating is carried out for a period of time of about 12 hours to about 96 hours.

10. The method of claim 1, further comprising terminating the heating; cooling the contents of the reaction to an ambient temperature; separating the CHA zeolite from the liquid mixture; wherein the liquid mixture separated from the CHA zeolite is a mother liquor solution comprising $SiO_2$, $Na_2O$, and water.

11. The method of claim 1, wherein the zeolite precursor mixture has a ratio of $H_2O$ to $Al_2O_3$ of about 400 to about 1000.

12. A method for preparing a CHA zeolite, the method comprising:
   mixing a mother liquor solution isolated from the reaction of claim 1 with a zeolite precursor mixture comprising a silicate solution, a zeolite, and a CHA templating agent;
   heating the mother liquor solution and the zeolite precursor mixture at ambient pressure under reflux conditions;
   wherein the mother liquor solution comprises $SiO_2$, $Na_2O$, and water;
   wherein heating comprises heating such that the zeolite precursor mixture and the mother liquor solution has a reaction temperature of from about 80° C. to about 120° C.; and
   thereby forming a CHA zeolite and a secondary mother liquor solution.

13. The method of claim 12, wherein the ambient pressure is about 700 torr to about 800 torr.

14. The method of claim 12, wherein the zeolite in the zeolite precursor mixture is selected from a USY zeolite, a heat-treated Na—Y zeolite, a Na—Y zeolite, and combinations thereof.

15. The method of claim 14, wherein the zeolite in the zeolite precursor mixture is selected from a heat-treated Na—Y zeolite, a Na—Y zeolite, and combinations thereof.

16. The method of claim 14, wherein the zeolite in the zeolite precursor mixture is a USY zeolite.

17. The method of claim 12, wherein the CHA templating agent in the zeolite precursor mixture is N,N,N-trimethyl-1-ammonium adamantine.

18. The method of claim 12, wherein heating further comprises heating such that an internal portion proximal to a top end of a reflux condenser containing reaction contents has a temperature of about 30° C. to about 70° C.

19. The method of claim 12, wherein the heating is carried out for a period of time of about 12 hours to about 96 hours.

20. The method of claim 12, wherein the CHA templating agent is selected from N, N, N-trimethyl-1-ammonium adamantine, tetraethylenepentamine, and a combination thereof.

* * * * *